United States Patent Office 3,207,784
Patented Sept. 21, 1965

3,207,784
HYDROGENATION PROCESS FOR REMOVING OXYGENATED IMPURITIES
Fred O. Barrett and Charles G. Goebel, Cincinnati, Ohio, assignors to Emery Industries, Inc., Cincinnati, Ohio, a corporation of Ohio
No Drawing. Filed May 22, 1962, Ser. No. 196,581
4 Claims. (Cl. 260—537)

This invention relates to a process for the catalytic hydrogenation of organic compounds. It is particularly directed to a method of this character for improving the color and stability of azelaic acid and the various by-product acids associated therewith, as formed by the disruptive oxidation of oleic acid. This application is a continuation-in-part of our co-pending application, Serial No. 831,704, filed August 5, 1959, now U.S. Patent No. 3,036,099 issued May 22, 1962.

Azelaic acid can be produced from oleic acid by the use of either a strong chemical oxidizing agent such as nitric acid or chromic acid, as described in Patent No. 2,450,858, or by the use of an ozone-containing oxidative stream which converts the oleic acid to the corresponding ozonide, with the latter then being decomposed and oxidized to azelaic, pelargonic and other carboxylic acids. The latter method is described in Patent No. 2,813,113. In either method, the product incorporates a variety of other oxygenated compounds whose presence is particularly deleterious from the standpoint of product color. While the pelargonic acid so produced can be recovered in relatively pure form as a distillate, this is not the case with the residual azelaic and other product acids which tend to remain contaminated with various oxygen-containing impurities no matter what method of acid recovery be employed. These impurities take the form of lactones, interesters and those compounds (primarily acids) wherein oxygen is also present as part of a ketonic group or of a secondary or tertiary hydroxyl group.

It is an object of this invention to provide a method for treating the azelaic or other desired acid product stream so as to free the same of impurities of this character, thus improving the initial color of the acid and giving it improved color-stability. The nature of still other objects of the invention will be apparent from a consideration of the descriptive portion to follow.

It has now been discovered that the foregoing object can be achieved by hydrogenating the azelaic or other carboxylic acid product stream in the presence of a nickel catalyst and from 1 to 10% of active clay, based on the weight of acid. By treating the acid products in this fashion, compounds containing lacetones and interesters groups are converted to the corresponding saturated fatty acids, while any keto or secondary or tertiary hydroxyl groups which may be present are converted to the corresponding saturated hydrocarbon groups. At the same time, saturation is effected of any ethylenic double bonds which may be present in the product undergoing hydrogenation, thus further increasing product stability.

The amout of nickel required in carrying out the process may range from a few tenths of one percent to as much as 3% or more, the optimum amount being dependent upon many other factors such as temperatures and pressure of hydrogen available, presence or absence of catalyst poisons and the desired completeness of the hydrogenation. In this respect hydrogenation in the presence of active clay is no different from any conventional hydrogenation operation.

The temperatures employed are not critical but must be above the activation temperature of the particular catalyst employed. Until a certain minimum temperature is reached, nickel catalyst will show practically no activity, but at temperatures usually between 150 and 250° C. the catalyst becomes active, with activity increasing only moderately with further increases in temperature.

The clay employed in our invention is one of the montmorillonite type which is either naturally active or artificially activated by acid treatment. Suitable clays are those sold under the trade name Filtrol by the Filtrol Corporation. From 1 to 10% based on the weight of the material to be hydrogenated is employed.

In general, our process involves introducing the material to be hydrogenated, together with .2 to 3% nickel catalyst and from 1 to 10% active clay, into a pressure vessel equipped with an agitator to keep the catalyst and clay in suspension. The charge is then heated to 150 to 250° C. and, after purging to remove air, hydrogen is introduced at 200 to 600 lbs. pressure. As hydrogenation reactions are exothermic it may be necessary to cool the vessel to maintain the temperature within the desired limits. The temperature and pressure are maintained until the hydrogenation is completed, reaction periods of from 2 to 12 hours being common. From time to time it may be necessary or desirable to vent off the water liberated by the reaction in order to force the reaction to completion. When the hydrogenation is complete, as determined by appropriate sample tests of product color and the like, the pressure is released and the product filtered to remove the clay and catalyst.

Although we do not wish to be limited by the following explanation, we believe that activated clays facilitate the hydrogenation of compounds containing secondary or tertiary hydroxyl, ketonic or lactone oxygen, first, because of their ability to catalyze the hydrolysis of lactones with the formation of hydroxyl and carboxyl groups, and second because the clays are effective in bringing about the elimination of water between a secondary or tertiary hydroxyl group, and the hydrogen of an adjacent carbon with the resultant formation of a double bond which is then rapidly hydrogenated to a saturated bond thus preventing reversal of the reaction and causing it to go to completion. The treatment with active clay and the hydrogenation must, therefore, be concurrent rather than successive in nature.

In the case of ketones or keto groups in polyfunctional materials the first step is hydrogenation to a secondary alcohol followed by the previously described steps.

If the reaction is carried out on saturated ketones or keto acids, or secondary or tertiary alcohols or hydroxy acids, the only reaction which takes place is the elimination of the non-carboxyl, oxygen-containing group. If the material being treated is unsaturated, then saturation of the unsaturated bonds also occurs. Thus, if an unsaturated or partially unsaturated carboxylic acid which also contains some undesired lactone is treated by the process of our invention, the unsaturation and the undesirable lactones may both be removed by a single processing step.

The method of this invention can be practiced with beneficial results when treating any of the various carboxylic acids, or mixtures of said acids, as produced by the disruptive oxidation of oleic acid. However, since pelargonic acid fractions, as distilled from the reaction mixture require little if any purification, the preferred practice is to apply the method to the treatment of the azelaic acid fraction and/or to the so-called by-product acids which normally are distilled off from the reaction product along with azelaic acid once the pelargonic acid fraction has been removed. This mixed, azelaic acid-containing distillate includes a wide variety of monobasic acids of undetermined identity which normally constitute about 15 to 30% of the acid mixture. Some of these monobasic, or by-product acids are saturated fatty acids which occurred as impurities in the oleic acid feed. Others are oxygenated products which boil within the same temperature range as the azelaic acid.

In carrying out this invention, the mixed, azelaic acid by-product acid stream can be hydrogenated, with the resultant product then being separated into its respective azelaic and by-product acid components. This treatment is that described in Example I, below. Alternatively, the mixed acid stream may be first separated, with one or both of the resultant azelaic acid and by-product acid fractions then being separately hydrogenated in accordance with the method of this invention. This separation step can be effected by extracting the mixture with hot water, the azelaic acid dissolving in the water and being recovered from the aqueous solution by evaporation or crystallization methods while the by-product acids constitute the undissolved residue. The hydrogenation of an azelaic fraction (first given an intermediate fractionation following extraction) forms the subject of Example II, while hydrogenation of a by-product acid fraction is described in Example III.

*Example I*

In this operation, 100 parts of a mixture of azelaic acid and by-product acids, as recovered from the product stream resulting from the ozonization of oleic acid, was subjected to hydrogenation in the presence of 0.5% by weight of a nickel on kieselguhr catalyst and 2% by weight of Filtrol, the treatment being continued for 4 hours at a hydrogen pressure of 300 p.s.i. and a temperature of 230° C. The contents of the autoclave were then filtered and the acids were distilled from the hydrogenated product. The azelaic acid was then separated from the remaining, by-product acid by extracting the mixture with boiling water. The soluble dibasic (azelaic) acids were recovered from the water layer by evaporation. The by-product acids are insoluble and are recovered by mechanical separation from the aqueous solution of dibasic acids. The hydrogenated dibasic acids had an acid value of 586, a color of 47/83% T. at 440 and 550 mmu., respectively, and a color stability of 17/53% T. The color stability is determined by holding the sample in a large test tube exposed to the air at 205° C. for 2 hours and then reading percent transmission at 440 and 550 mmu. The hydrogenated by-product acids had a color of 45/87% T. and a color stability of 15/45% T. These values compare with those of about 22/71% T. (color) and 5/28% T. (stability) for azelaic acid as recovered from the hot water extraction step, and of about 8/53% T. (color) and 4/20% T. (stability) for the by-product acids as similarly recovered. Distillation of the non-hydrogenated azelaic and by-product acid fractions gives products having color and stability values intermediate between these here reported for the corresponding hydrogenated and non-hydrogenated acid fractions.

The two digit figure before the slant line indicates color transmission at 440 mmu (yellow) and the figure following the slant line indicates color transmission at 550 mmu (red), and "T" means "transmission." The color measurement indicates the initial color of the sample and the color stability indicates the change in color transmission after the defined exposure of the sample to heat in the presence of air.

*Example II*

Commercial grade azelaic acid, prepared by the ozonization of oleic acid, had an A.V. 586, a color of 28/75% T. at 440 and 550 mmu. respectively and a color stability of 6/36% T. One hundred parts of this acid was hydrogenated in a small rocking-type autoclave at 230° C. for 4 hours at 300 p.s.i. hydrogen pressure in the presence of 2 parts of Filtrol and 0.5 part of a supported nickel catalyst. The hydrogenated material was sludged, filtered and distilled, a small top cut being discarded. The distillate (88% of still feed) had an A.V. 596, a color of 91/95% T. and a color stability of 75/93% T. A sample of the original acid, distilled in the same manner, but unhydrogenated, had an A.V. 595, color 82/97% T. and color stability 51/88% T.

*Example III*

From the ozonization of commercial oleic acid there is obtained a mixture of by-product acids consisting chiefly of monobasic acids together with lesser amounts of dibasic acids and of various oxygenated products formed during the ozonization step. This material had an acid value of 252, a saponification value of 282, an iodine value of 5, a color of 28/83% T. and a color stability of 6/39% T. One hundred parts of this material were hydrogenated in a small rocking-type autoclave using 2% by weight Filtrol and 0.5% by weight of Harshaw 0104P nickel catalyst at 230° C. for 4 hours under 300 p.s.i. hydrogen pressure. The contents of the autoclave were sludged, filtered and distilled to yield a product having an acid value of 264, a saponification value of 286, an iodine value of 0.8, color of 80/97% T. and color stability of 46/91% T. Distillation of hydrogenated by-product acids of this same type typically yields a material of color 35/97% T. and color stability of 20/82% T.

We claim:

1. A method of treating a carboxylic acid product formed by the ozonization of oleic acid and oxidative-decomposition of the resulting ozonide to decrease the color and to improve the color stability of said acid product which comprises treating said carboxylic acid product with hydrogen under pressure in the presence of an active nickel catalyst and at a temperature of at least 150° C. and in the further presence of from 1 to 10% of an active montmorillonite clay based on the weight of the material being hydrogenated.

2. The method of claim 1 wherein the carboxylic acid product being treated is made up essentially of azelaic acid recovered from the total product of ozonization and oxidative-decomposition.

3. The method of claim 1 wherein the carboxylic acid product being treated comprises a mixture of azelaic acid and of various by-product acids, said mixture having been distilled from the reaction product recovered from the ozonization operation after removal of pelargonic acid.

4. The method of claim 3 wherein the carboxylic acid product being treated is made up of the by-product acid portion of the defined mixture.

References Cited by the Examiner

UNITED STATES PATENTS

| | | | |
|---|---|---|---|
| 2,813,113 | 11/57 | Goebel | 260—537 X |
| 2,862,940 | 12/58 | Otsuki | 260—406 X |
| 2,897,231 | 7/59 | Niegowski | 260—537 X |
| 3,036,099 | 5/62 | Barrett | 260—406 X |

OTHER REFERENCES

Rieche: Annalen der Chemie, vol. 553 (1942), pp. 201–212 and 242–243.

LORRAINE A. WEINBERGER, *Primary Examiner.*

LEON ZITVER, *Examiner.*